United States Patent [19]
Paul et al.

[11] Patent Number: 4,804,427
[45] Date of Patent: Feb. 14, 1989

[54] COMPOSITES VIA IN-SITU POLYMERIZATION OF COMPOSITE MATRICES USING A POLYMERIZATION INITIATOR BOUND TO A FIBER COATING

[75] Inventors: Charles W. Paul, Madison; Joseph E. Mackey, East Hanover, both of N.J.

[73] Assignee: Allied-Signal Inc., Morris Township, Morris County, N.J.

[21] Appl. No.: 927,201

[22] Filed: Nov. 5, 1986

[51] Int. Cl.$^4$ .......................... D04H 3/08; B05D 3/04
[52] U.S. Cl. .................................. 156/181; 156/180; 156/296; 156/307.3; 156/314; 427/333; 428/420
[58] Field of Search ............... 156/180, 181, 314, 315, 156/296, 307.3, 910; 427/407.1, 333; 428/420

[56] References Cited

U.S. PATENT DOCUMENTS

| | | | |
|---|---|---|---|
| 2,902,398 | 9/1959 | Schroeder | 156/315 |
| 3,737,352 | 6/1973 | Avis et al. | |
| 3,862,287 | 1/1975 | Davis | |
| 4,053,680 | 10/1977 | Wassermann | 428/420 X |
| 4,157,360 | 6/1979 | Prevorsek et al. | |
| 4,221,697 | 9/1980 | Osborn et al. | 524/853 |
| 4,251,642 | 2/1981 | Tan et al. | 525/71 X |
| 4,334,045 | 6/1982 | Wu et al. | |
| 4,374,114 | 2/1983 | Kim et al. | |
| 4,426,243 | 1/1984 | Briggs | 156/314 X |

FOREIGN PATENT DOCUMENTS 1278030  10/1961  France .................. 428/420

Primary Examiner—Michael W. Bell
Assistant Examiner—Jeff H. Aftergut
Attorney, Agent, or Firm—Richard C. Stewart, II; Gerhard H. Fuchs

[57] ABSTRACT

This invention is directed to a process of forming composites comprising reinforcing fibers dispersed in a thermoplastic polymer matrix, said process comprising the steps of coating a reinforcing fiber with a curable resin and an initiator for the curing of the resin and for the polymerization of monomer of said polymer; curing said resin to form cured resin coated fiber; coating said resin coated fiber with monomer of said polymer; polymerizing the monomer coating to form a polymer/resin coated fiber; and aligning the polymer/resin coated fiber and molding same into a desired reinforced thermoplastic composite.

27 Claims, No Drawings

COMPOSITES VIA IN-SITU POLYMERIZATION OF COMPOSITE MATRICES USING A POLYMERIZATION INITIATOR BOUND TO A FIBER COATING

BACKGROUND OF THE INVENTION

1. Field of the Invention

This invention relates to improved thermoplastic composites and to methods of preparing same. The improved thermoplastic composition which comprises a thermoplastic polymer having fibrous reinforcement dispersed therein. The present invention also relates to producing prepregs used in the formation of laminates and pultrusions and filament wound articles (all forms of composites) having high performance fibers and polymeric matrices.

2. Prior Art

Prepregs are a well known intermediate form in the preperation of composites having high performance fibers and polymeric matrices. In the most common form, a prepreg contains a series of parallel fibers (such as boron or carbon or glass fibers) held together with a thermosetting polymer such as an epoxy resin. One method for forming prepregs is to size (impregnate the interstices of) a multifilament bundle of high performance fibers with a dilute solution of the resin, and then coat the sized fibers with a melt or concentrated solution of the resin. Thereafter, the coated fibers are layered up in parallel fashion; and the resultant sheet is dried in order to produce a sheet which holds together reasonably well in the transverse direction. Subsequently, a series of such sheets are stacked with the fiber direction varied in a regular manner, and the assemblage is cured either in a closed mold or in an autoclave under increased temperature and superatmospheric pressure.

Pultruded articles are composites prepared by aligning high performance fibers coated with a thermosetting resin in a substantially parallel linear array and curing the assemblage. Examples include structural parts such as I-beams. Filament wound articles are formed by winding similar coated fibers in multiple layers on a substrate (e.g., a mandrell or a part) and curing the assemblage. Pultrusion and filament winding processes may differ from prepreg processes in that in the pultrusion and filament winding processes, a prepreg is not isolated and arranged into a desired shape before curing. When fibers for pultrusions or filament winding are coated from solution, the drying step may overlap both with the aligning step and the curing step.

It has been proposed that fiber filled composites can be formed by passing roving that is spread out to expose its multiple filaments through a fluidized bed containing resin microparticles of the same diameter as an individual filament (8 to 20 microns). The roving, which has been pretreated with sizing to temporarily retain the resin particles in place is then consolidated and sheathed with an extrusion coating of the same resin. This process is claimed to provide a more uniform resin content. Several disadvantages flow from this process. For example, air pockets are trapped in the rovings which are difficult to remove. The trapped air results in voids in the filled composition resulting in a reduction of strength. Moreover, the use of the sizing may be detrimental to forming a strong interface bond between the resin and the fiber, and precludes any tailoring of the sizing to the type of fiber and resin.

SUMMARY OF THE INVENTION

In accordance with the present invention, there is provided a process for the manufacture of composites comprising continuous reinforcing fibers coated with one or more curable resins dispersed in a continuous phase of one or more polymers, said process comprising the steps of:

(a) impregnating one or more bundles of said continuous reinforcing fibers with one or more curable resins which bond to the surface of said fibers during the curing of said resins and with one or more initiators for promoting the curing of said resins, said initiators bonding to said resins forming residues which become a part of said resins during the curing thereof, and said initiators being initiators for the polymerization of monomers of said polymer and bonding to said polymer during the polymerization of said monomers forming residues which become a part of said polymer; and (b) partially, incompletely or completely curing said resins to form bundles of continuous reinforcing fibers impregnated with said partially, incompletely or completely cured resins having said resins bonded to the surface of said fibers; and (c) impregnating said bundle of continuous reinforcing fibers impregnated with said partially, completely or incompletely cured resins with one or more of said monomers, thereby coating said cured resins bonded to the surface of said fibers with said monomers; and (d) forming two or more of said bundles into a composite employing a procedure selected from the group consisting of:

(i) polymerizing said monomers impregnating said bundles, and further curing said resins if necessary, to form impregnated bundles of fibers containing polymer and completely cured resin, said resins coating and bonded to said fibers, and said polymers coating and bonded to said completely cured resins by said residues of said initiators;

aligning two or more of said impregnated bundles of fibers containing polymer and completely cured resin into a desired shape; and molding said aligned bundles into a composite comprising said fibers dispersed in a continuous phase of said polymers said completely cured resins coating and bonded to said fibers and said polymers coating and bonded to said completely cured resins by said residues of said initiators; and (ii) aligning two or more of said fiber bundles impregnated with monomer and completely, incompletely or partially cured resin into a desired shape, and polymerizing said monomer, and further curing said resin if necessary, to form a composite comprising said fibers dispersed in a continuous phase of said polymer, said resin coating and being bonded to said fibers and said polymer coating and being bonded to said resin by said residues of said initiators.

As used herein "completely cured" resins are those in which less than about 20 mole percent of the original curable groups remain unreacted as determined by the method of infrared spectrophotometry; "partially cured" resins are those in which from about 40 to about 80 mole percent of the original curable groups remain unreacted determined by the method of infrared spectrophotometry; and "incompletely cured" compositions are those in which less than about 40 mole percent of the original curable groups are unreacted as determined by the method of infrared spectrophotometry.

The composite formed by the process of this invention are superior to those formed by other conventional methods such as solution impregnation, film stacking, hot melt impregnation or fluidized bed coating because among other advantages the process allows for good fiber wetting, higher fiber loading, and a relatively superior fiber/matrix interface. The resulting composite exhibits superior flexural properties.

DETAILED DESCRIPTION OF THE INVENTION

The first step of the process of this invention comprises impregnating bundles of continuous reinforcing fibers with one or more curable resins and one or more initiators for curing said resins and polymerizing said monomers. These initiators bond to the cured resin and polymer during the curing and polymerization steps respectively. The types of impregnation procedures which may be used will vary widely and any conventional bundle impregnation techniques can be used. For example, in the preferred embodiments of the invention, the bundles are first impregnated with the curable resins and the initiators prior to impregnation with the monomer and thereafter the resins are partially cured, incompletely cured or completely cured to ensure that curable resin will be able to coat and effect a bond with the fiber so that the resins remain on the fiber and do not dissolve in the liquid monomer when same is used to impregnate the bundle of fiber. Coating the fiber with resin and curing the resin before impregnation with the monomer also allows for bonding of the initiators to the resins.

The types of impregnation procedures which may be used in the practice of this invention may vary widely, and any conventional bundle impregnation technique can be used. For example, one preferred and convenient method for impregnating the bundles of fibers, and coating individual fibers with the various components is to first pass the bundles of continuous fibers through a liquid containing the curable resin and an effective amount of initiator, and thereafter curing the resin to form a partially cured, incompletely cured or completely cured resin bonded to the surface of the fibers and bonded to said initiator. The bundles of continuous fibers are then passed through liquid monomer or a solution containing the monomer. Thereafter, the bundles of continuous fiber can be conducted to the next process steps, as for example further curing to complete curing of the resin, if necessary, and the polymerizing step. Useful bundle impregnation techniques are described in more detail in Handbook of Composites (George Lubin ed., Van Nostrand published 1982) which is hereby incorporated by reference.

The continuous reinforcing fibers used in the process of the present invention may be any of a variety of conventional materials used as continuous reinforcement in both thermoplastic and thermoset compositions, the only requirement being that the fiber has a surface which has a strong affinity for the particular curable resin employed, such as forming covalent bonds or ionic bonds with the curable resin, or having strong van der waals interactions therewith. For example, suitable fibers are those which contain surface functional groups, such as hydroxyl, carboxylic acid, thiol, amino, olefin, cyanate, ester, amide, and like reactive functional groups. Such functional groups may naturally exist on the surface of some fibers. Alternatively, fibers can be treated by reagents to introduce such functional groups. For example, organic fibers may be treated with chemical oxidisers such as chromic acid, nitric acid, and the like; or exposed to corona discharge in air or an oxygen plasma; or subjected to electrochemical oxidation to introduce functional groups such as hydroxyl and carboxylic acid on to the surface of the fiber.

Reinforcing fibers useful in the practice of this invention may vary widely. Useful reinforcing fibers include inorganic fibers such as carbon fibers (including graphite fibers), glass fibers (E-S, high silica, or quartz types), boron fibers, a variety of ceramic fibers derived from alumina, and silicon carbide fibres, and organic fibers having high strength and modulus such as Kevlar type aramids, polyethylene, poly(benzimidazole), aromatic polyesters, and the like. Various reinforcing fibers which are useful in the conduct of this invention are well known in the art and will not be described herein in great detail. Preferred carbon fibers are well known in the prepreg art, as indicated for example, by Handbook of Composite, (George Lubin ed, Van Nostrand pub. 1982).

In the preferred embodiments of the invention, the continuous reinforcing fibers of choice are carbon, boron, glass, aramid, poly(benzimidazole), aromatic polyesters, and polyethylene, and in the particularly preferred embodiments are S-glass, E-glass, boron, aramid, polyethylene, and carbon fibers. Amongst these particularly preferred embodiments, most preferred are those embodiments of the invention in which the continuous reinforcing fibers are glass fibers, aramid fibers such as Kevlar, polyethylene fibers and carbon fibers, with carbon fibers and glass fibers being the fiber reinforcements of choice. In the case of the especially preferred carbon fibers, multi-filament fibers, and especially fibers with 1,000 or more filaments, are preferred. Such multi-filament carbon fibers are available either in sized or unsized form, in a variety of thicknesses per filament, total thicknesses, filament numbers, tensile strength and modulus. Included within the carbon fibers useful in the present invention are those sold under the following trademarks of the following companies: CELION® 6000, 3000, 12000 (Celanese Corporation); FORTAFIL® 3 (Great Lakes Carbon); HI-TEX® 3000, 2000, 12000 (HITCO Corporation); AS, NTS, NMS (Hrecules Incorporated); THORNEL® 50, 300; P55 BS, P75, P100 (Union Carbide Corporation). Properties of these fibers are summarized in Table 11.1 on pages 225–26 of Lubin's Handbook of Composites, cited above.

Fibers for use in the practice of this invention may be unsized or such fibers may be sized with suitable sizing agents. As will be appreciated in the art, sizing is normally conducted by passing a multifilament fiber through the material to be applied as a solution thereof in a volatile solvent in which the continuous reinforcing fibers are substantially insoluble.

The type of curable resin employed in the conduct of this invention may vary widely. In each particular instance, the choice of resin will depend on a number of factors including the desired properties of the composite, on the type of fiber employed, and the like. In general, resins which are used in any particular instance are those which have high affinities for the fiber of choice, due to forming bonds, as for example covalent bonds or ionic bonds with functional groups on the surface of the fiber, or due to strong van der Waals or other physical interactions with the surface of the fiber. For example, when the fiber of choice is carbon, often the surface of the carbon fiber is oxidized to introduce hydroxyl and carboxylic functional groups on the surface of the fiber. Such functional groups will react with and form bonds with certain curable resins, such as epoxy resins, during the curing process. Other organic fibers may react in a similar fashion with such curable resins when hydroxyl and carboxylic acid functionalities are present on the fiber surface. Such functionalities may be introduced by chemical oxidisers such as nitric acid or chromic acid, or by exposing the fibers to a corona discharge in air or an oxygen plasma, or by subjecting the fiber to electrochemical oxidation.

Curable resins useful in the practice of this invention may vary widely. The only requirement is that the curing of the resins be promoted by an initiator which becomes a part of the cured resin during the curing process. Illustrative of suitable curable resins are thermoset resins such as phenolic resins, epoxy resins, allylic resins, alkyd resins, urethane resins, unsaturated polester resins, amino (melamine and urea) resins, and like curable resins. Preferred for use in the practice of this invention are epoxy resins. These preferred epoxy resins are those prepared by reaction between an aliphatic or cycloaliphatic epoxide, or a halo epihydrin, and an aliphatic, cycloaliphatic or aromatic polyol in the presence of a catalyst. Illustrative of such preferred epoxy resins are those formed by reaction of epichlorohydrin with a polyhydroxy compound such as bisphenol A. These epoxy resins are known as diglycidyl ethers of bisphenol A. Also illustrative of the preferred epoxy resins are epoxy phenol novolac resins which are basically novolac resins in which all or a portion of the phenolic hydroxyl groups have been converted to glycidyl ethers. Some commercially available epoxy resins which may be used in the practice of this invention include Epon resins from Shell Chemical, such as Epon 826 and Epon 828; Araldite resins from Ciba Geigy including epoxy-novolac (such as EPN 1139), epoxy phenol novolac (such as XB 3337), and epoxy cresol novolac (such as ECN 1235), and DER resins from Dow Chemical such as DER 330 and DEN 485.

Monomers selected for use in the practice of this invention are not critical, the only requirement being that the monomers form a thermoplastic polymer and that the polymerization of the resin be initiated by an initiator which becomes a part of the polymer chain. Illustrative of such monomers are those which polymerize by ring-opening or by addition. Illustrative of such monomers which polymerize by ring-opening are those which form polymers such as polylactones, such as poly(2,2-diethyl $\beta$-propio-lactone), poly(2,2-bis(chloromethyl) $\beta$-propio-lactone), poly(2,2-diphenyl $\beta$-propiolactone) poly(6-oxa-bicyclo(2.2.2) octan-5-one), poly($\delta$-valerolactone), poly(1,4-dioxane-2-one), poly($\alpha,\alpha$-dimethyl $\beta$ propiolactone), polylactide, poly($\epsilon$-caprolactone), poly(3-oxa-$\epsilon$-caprolactone), and the like; and polylactams such as poly(caprolactam), poly(laurolactam), poly(caprylactam), poly(pivlolactam), poly(6-azabicyclo (2.2.2) octan-5-one), poly(7-azabicyclo (3.2.1) octan-6-one), and the like.

Illustrative of such monomers which polymerize by addition are those which form polymers such as polystyrene, poly(1,3-butadiene) poly($\alpha$-methylstyrene), poly($\alpha$-chlorostyrene), poly(4-methoxy styrene), poly(vinyl chloride), poly(vinyl acetate), poly(vinyl methyl ether), poly(vinyl butylether), poly(vinyl methyl ketone), poly(vinyl formate), poly(vinyl pyrrolidone), poly(vinyl carbazole), poly(methylpentene), poly(acrylonitrile), poly(methyl acrylate), poly(acrylic acid), poly(butyl acrylate), poly(methacrylic acid), poly(methylmethacrylate) poly(acrylamide), and the like.

Preferred for use as monomers in the practice of this invention are cyclic monomers such as lactones and lactams which polymerize by ring opening. Illustrative of such preferred monomers are caprolactam, laurolactam, caapryllactam, pivalolactam, bicyclic lactams (such as 6-azabicyclo(2.2.2)octan-5-one, 7-azabicyclo(3.2.1) octan-6-one, bicyclic lactones such as 6-oxabicyclo(2.2.2) octan-5-one; and $\alpha,\alpha$-disubstituted $\beta$-propiolactones such as pivalolactone, $\alpha,\alpha$-diethyl $\beta$-propiolactone, $\alpha,\alpha$-bis-(chloromethyl) $\beta$-propiolactone, $\alpha,\alpha$-diphenyl $\beta$-propiolactone, and the like.

Of the preferred lactam and lactone monomers, preferred for use in the practice of this invention are monomers selected from the group consisting of lactams such as caprolactam, laurolactam, capryllactam, pivalolactam; and lactones such as pivalolactone, $\alpha,\alpha$-diethyl-$\beta$propiolactone, and $\alpha,\alpha$-diphenyl-$\beta$propiolactone. Particularly preferred for use as monomers in the practice of this invention are caprolactam and pivalolactone, and most preferred is pivalolactone.

Initiators used in the practice of this invention may vary widely. Useful initiators are those which contain functionalities which can promote the curing of the curable resin and initiate the polymerization of the monomer, which funcationalities are or become a structural part of the resin and the polymer. As a result, the residue of the initiator functions as a linking group bonding the cured resin to the polymer. The initiators may be compounds which are separate and distinct from the resin, and which are multifunctional and which contain functionalities which promote the cure of the curable resin and which initiates the polymerization of the monomer as described above. The initiators may also be mixtures of materials, one class of materials having functionalities for promoting the cure of the resins, and the other class of materials being a curable resin or other materials capable of cocuring with said resin and having functionalities for initiating the polymerization of the monomer. Useful initiators will depend on the particular resin and monomers employed. For example, when the resin is an epoxy and the monomer is a lactone, useful initiators will include functionalities which act as curing agents for the curing of the epoxy resins, such as polyamine, anhydride, thiol and polybasic acid functions and functionalities which initiate the polymerization of lactones such as phosphine functions and carboxylate functions. Illustrative of such materials are compounds which include an amine function (preferably a primary amine function) and a phosphine function such as bis(3-aminopropyl) phenyl phosphine, and compounds which include both an amine function (preferably a primary amine) and carboxylic acid salts such as the tetramethyl ammonium salt of p-aminobenzoic acid. Similarly, when the resin is an epoxy resin and the monomer is a lactam, useful initiators will include one or more functionalities which initiate the curing of an epoxy resin such as those listed above, and one or more functionalities for initiating the polymerization of the lactam, such as alcoholate functions, organic acid salt functions and amide salt functions. In some cases, functional groups capable of promoting cure of the resin may also be capable of initiating polymerization of the monomer. In these cases a sufficient amount of the multifunctional initiator should be added to permit full curing of the resin and initiation of polymerization. Useful initators and the amounts thereof, and other reaction parameters required in the curing and polymerization step are well known in the art and will not be described herein in great detail. Illustrative of such useful initiators and reaction parameters are those described in "Preparative Methods of Polymer Chemistry", Sorenson & Campbell, Interscience Publishers (1978) which is incorporated herein by reference.

In the preferred embodiments of this invention, useful initiators will include functionalities which promote the curing of epoxy resins and which initiate the polymerization of lactones and lactams. Such preferred initiators contain functionalities which initiate the polymerization of $\beta$-lactones such as amino functions (prefrably tertiary) as for example methylphenylamino, diphenylamino, dimethylamino and like amino functions; phosphino functions (preferably tertiary) such dimethyl phosphino, diethylphosphino, methylethylphosphino, diphenylphosphino, and the like phosphino functions; functionalities which can polymerize $\beta$ and larger ring lactones as well as lactams such as metal carboxylate functions as for example alkali metal carboxylic salt functions such as lithium, sodium and potassium carboxylate salt functions, quaternary ammonium carboxylate salt functions and the like; alcoholate functions such as sodium alcoholate functions derived from an alcohol by replacing the hydroxyl function with a base such as sodium; functionalities which can polymerize lactams such as amide salts as for example magnesium bromo caprolactam and which include functionalities for the curing of epoxy resins such as poly primary amino functions, polybasic acid functions, anhydride functions, polyhydroxy functions, poly thiol functions, and like functions. A difunctional compound which is representative of those which can be used in the practice of this invention to initiate curing of epoxy resins and the polymerization of $\beta$-lactones is bis-(3-aminopropyl)phenyl phosphine in which the two amino functions initiate curing of the epoxy and the phospine function initiates polymerization of the polymer.

Although not essential, nucleating agents may be added to the monomer to provide maximum toughness. A variety of materials known to be effective as nucleating agents for other crystalline polymers can be used such as metal salts of aromatic or alicyclic carboxylic or sulfonic acids (e.g., lithium benzoate, sodium, $\alpha$-naphthalene sulfonate, sodium cyclohexane carboxylate), salts of aliphatic mono or dibasic carboxylic or sulfonic acids (e.g., sodium caproate, sodium succinate), salts of arylalkyl carboxylic or sulfonic acids (e.g., aluminum phenylacetate), or particulate inorganic materials (clays, silica, titanium dioxide, and the like). The amount of the nucleating agent can range from about 0.01 to about 3 weight percent based on the total weight of the molding composition. More preferably, the nucleating agent ranges from about 0.1 to about 1 weight percent based on the total weight of the molding composition.

Other additives for appearance and property improvement can be incorporated into the molding compounds of the present invention such as colorants, antioxidants, stabilizers, and the like. Examples of suitable antioxidants are 1,3,5-trimethyl-2,4-bis(3,5-ditert-butyl-4-hydroxybenzyl)benzene and N-phenyl-$\beta$-naphthylamine. Examples of suitable stabilizers are dialkyl sulfides such as dilauryl sulfide or dicetyl sulfide.

The contact times for the impregnating steps are not critical and are usually not very long. For example, contact times of from a few seconds to a few minutes are generally suitable. Moreover, the temperature and pressure at which the impregnating step is carried out is not critical. For convenience, the impregnating step is usually carried out at about room temperature (20° C. to about 30° C.) and at atmospheric pressures if the monomer is a liquid at room temperature. If not, the monomer may be applied at elevated temperature or in solution.

In the second step of the process of this invention, the impregnated bundles of continuous fiber are formed into the desired composite comprising the fiber dispersed in a continuous phase of the thermoplastic polymer. Several methods may be employed, differing only as to when polymerization is carried out and when curing is completed. In one of these preferred procedures, the bundles are impregnated with the curable resin and initiator and the resin is partially, completely or incompletely cured to form a resin impregnated bundle where the partially, completely or incompletely cured resin is bonded to the surface of the fibers. Thereafter, the bundles are impregnated with the monomer which is polymerized, the resin is further cured (if necessary), and the fiber bundles impregnated with polymer/completely cured resin are aligned and consolidated or molded into a desired composite shape. In the other embodiment, the bundles are impregnated with resin and initiator and the resin is partially, completely or incompletely cured to form a resin impregnated fiber bundle in which the resin is bonded to the surface of the fiber. The bundle is then impregnated with monomer and the monomer impregnated bundles are aligned in a desired shape. The monomer is then polymerized and the resin further cured (if necessary) to form the desired shaped composite. Each of these methods for forming the fiber bundles impregnated with polymer/completely cured resin into the composite is equally desirable and represent the preferred embodiments of carrying out the forming step.

The methods employed to polymerize monomers into the corresponding polymer and to cure epoxy resins respectively are well known in the art and will not be described in great detail. For example, useful procedures are described in "Preparation Methods in Polymer Chemistry," Sorenson & Campbell Interscience Publishers (1968). Briefly stated, to polymerize the monomer and to cure the resin, the coated fiber formed as described below either as individual fibers or as a bundle of fibers, or as bundles of fibers which have been aligned into a desired shape are heated to a temperature which is at least sufficient to promote the initiation of the polymerization and curing reaction and which is less than the degradation temperature of the monomers, cured resins, precured resins, polymers and/or continuous fibers. As indicated, the temperature will depend on monomers, initiator, precured resin and/or fibers, and can vary widely. In general, the polymerization temperature is from about room temperature to about the melting point of the polymer being prepared or at a temperature above the glass transition temperature of said polymer. In the preferred embodiments of the invention, the polymerization temperature is from about 50° C. to about 280° C., and in the particularly preferred embodiments of the invention the polymerization temperature is from about 90° C. to about 160° C.

The methods of aligning the monomer, partially, completely or incompletely cured resin and initiator impregnated bundles, or polymer and partially, completely of incompletely cured resin impregnated bundles into the desired shape are not critical and may differ widely depending upon the nature of the composite being formed. For example, such step will vary depending upon whether a prepreg, pultrusion or filament-wound article is being made. The following discussion will deal with prepregs first, and thereafter with the other two. It should be understood that anything said about prepregs would apply, with modifications apparent to one skilled in the composite field, to the other two.

For the prepregs, the polymer and partially, completely or incompletely cured resin, or monomer, and partially, completely or incompletely cured resin, impregnated bundles of fibers are aligned in a conventional fashion, with one convenient means of doing so involving the use of large rollers. By winding a monolayer of polymer and partially, completely or incompletely cured resin, or monomer and partially, completely or incompletely cured resin impregnated bundles of fibers on a large roller, a cylindrical sheet of aligned and impregnated bundles of fibers can be formed. The circumference and height of such a large roller can be varied depending upon what size prepregs are desired, with typical dimensions being between about 0.5 and about 3 meters in height. In those embodiments in which the monomer and partially, completely or incompletely cured resin impregnated bundles have been aligned, the monomer is polymerized and the resin is further cured, if necessary, using conventional techniques for polymerizing monomers and curing resins to form a continuous cylinder of a composite comprising a continuous polymer phase having dispersed therein fiber having the cured resin bonded to the surface thereof and having the polymer phase bonded to the cured resin by way of the residues of the initiators. It should be appreciated that aligning, polymerization and further curing can be carried out simultaneously. In those embodiments of the invention in which the polymer and partially, completely or incompletely cured resin impregnated bundles are aligned, the aligned bundles are moulded into a composite containing a continuous polymer phase containing dispersed continuous fibers having the cured resin bonded to the surface thereof, and in which the polymer phase is bonded to the cured resin by residues of the initiator. It will be appreciated that, once the aligned bundles of fibers are consolidated, a sheet can be cut off of the roll with the circumference of the roll providing the maximum height of the sheet and the width of the roll providing the width of the sheet.

Although the use of a roll is a preferred means of aligning the coated fibers, other techniques such as pick-up on a conveyer or release paper may be used. In any case, it is desirable, in order to achieve a prepreg of uniform geometric arrangement, that the fibers be carefully aligned in a generally parallel fashion with the coating of adjacent coated fibers touching (in sufficient contact to have a continuous sheet without voids).

Once the aligned polymer/partially, completely or incompletely cured resin/initiator, or monomer/partially, completely or incompletely cured resin/initiator impregnated bundles fibers have been formed (e.g., on the roll) they would normally be stacked in any conventional fashion such as $(0°, +45°, -45°, 90°)_{ns}$ to form a multilayer and then heated to form the consolidated shape. Heating of the assemblage may be conducted in a mold with pressures (e.g., from about 0.2 to about 10 MPa) and temperatures (e.g., from about 180° to about 310° C.) or in an autoclave. The bagging used for curing epoxy composites in an autoclave is preferably used (but is not required) in heating an assemblage of the present prepregs in an autoclave. To reduce loss of geometrical configuration in an autoclave or a mold, some staging of temperatures and/or pressures may be desirable, but shorter overall heating times and less complex staging requirements should be present compared to those required for high temperature epoxy composites.

The total fiber content (by volume) of the prepregs of the present invention may be varied, by modifying the quantity of the impregnating monomer, employed along a broad range as for example from about 25 volume percent fibers to about 80 volume percent fibers in the prepreg based on the total weight of the prepreg. The fiber content of the final molded or cured composite will generally be only slightly more than that of the prepreg. In addition, however, if a lower fiber content is desired, it is permissible to coat the same bundle of fibers with multiple passes prior to the aligning and polymerizing curing steps. In such instance, it is preferred to polymerize monomer and cure the resin impregnating the bundles of fibers at least partially, between successive passes.

For pultrusions, a multitude of the impregnated bundles of high performance fibers will be aligned generally in a continuous operation, so that the fibers are each generally linear, and collectively in a substantially parallel array. Unlike prepregs, this array will not normally be a monolayer, but instead be an array with significant thickness (in numbers of fibers) in all directions transverse to the individual fibers. The heating operation for consolidation of the bundles into the composite normally proceeds directly after alignment in those instances where monomer/precured resin impregnated bundles are aligned, the monomers are polymerized and the resin cured and the polymer/cured resin impregnated bundles consolidated into the desired shape in the heating step. The fiber content of the part at the heating stage is generally about 40 to about 80% fibers.

For filament winding, the impregnated bundle of high performance fibers will be aligned on a substrate, which may either be a mandrel to impart a shape for the interior of a composite or an object or part which the composite is to cover in the final application. Examples of such substrates are wheel rims, pipes, pressure vessels and shafts. The winding may be similar to that used for winding a roller in making prepregs except that multiple layers are formed, generally with the fibers angled away from a direct circumferential direction in a crossing arrangement between layers. As with pultrusions, the heating step for either consolidation or polymerization/curing and consolidation usually immediately follows aligning.

The composites of this invention have many uses. For example, these composites can be used as replacements for metals in aircraft, automotive and a variety of other applications.

Through use of the process of this invention, the bundles of continuous fibers are thoroughly and uniformly impregnated thus forming thoroughly and uniformly coated fibers. The result is composites having maximized fiber content and minimized voids.

Moreover, because the cured resin is bonded to the surface of the fibers and the polymer is bonded to the surface of the resin by way of the initiator linkages. The result is that the composite exhibit greater flexural strength than composites formed by conventional procedures.

The following examples are presented to more particularly illustrate the invention, and are not to be construed as limitations thereon.

COMPARATIVE EXAMPLE 1

A tow of carbon fibers (AS4-12K from Hercules) was pulled through a nozzle where it was impregnated with pivalolactone monomer. The monomer contained $1\times10^{-3}$ ml/g of tri-n-butyl phosphine (Bu$_3$P) as a polymerization initiator and $1\times10^3$ g/g of N-phenyl-2-naphthylamine as an antioxidant for the subsequent polymer. The monomer-impregnated tow was then wound onto a heated drum at 140° C. Polymerization was complete in about ½ minute. After the entire drum was wound with fiber/polymer it was cut off the drum and pieces were then cut from this sheet of prepreg material. Several pieces of prepreg were stacked and then fused by vacuum/compression molding into a unidirectional laminate.

COMPARATIVE EXAMPLE 2

A tow of carbon fibers (AS4-12K from Hercules) was coated with an epoxy resin by pulling the tow through a nozzle where it was coated with a 1.1% g/ml solution of DER 330 (a diglycidyl ether of bisphenol A based epoxy from Dow Chemical) in acetone. The two was then wound onto a drum where the acteone was allowed to evaporate away for several hours. The fiber was then rewound onto a 3 inch spool once all the acetone was removed.

These fibers were then used to form a prepreg in the same manner described in Comparative Example 1 except that the drum temperature was 130° C.

COMPARATIVE EXAMPLE 3

A tow of carbon fibers (AS4-12K from Hercules) was coated with an epoxy resin and an aliphatic amine curing agent by pulling the tow through a nozzle where it was impregnated with a solution containing 1.2% g/ml DER 330 and 0.15% of HMDA (1,6-hexane diamine) in methylene chloride. The tow was then wound onto a drum where the methylene chloride was allowed to evaporate for several hours. The fiber was then rewound onto a 3 inch spool. The relative amounts of epoxy and amine were chosen such that their weight ratio was slightly less (100/12.5) than stoichiometric (100/15.9). The fibers were allowed to stand so that the epoxy/amine coating could cure. After about 24 hours had elapsed from the time the fibers were coated, they were used to form a polypivalolactone (PPL)/carbon fiber prepreg using the procedures described in Comparative Example 1, but with a drum temperature of 130° C.

COMPARATIVE EXAMPLE 4

A tow of carbon fibers (AS4-12K from Hercules) was coated with an epoxy resin and an aromatic amine curin agent by pulling the tow through a nozzle where it was impregnated with a solution containing 1.2% g/ml DER 330, 0.27% DDS (4,4'diamino diphenyl sulfone), and 0.01% BF3-MEA (boron trifluoride monoethylamine) in acetone. The BF3-MEA serves to accelerate the reaction of the epoxy and amine. After the evaporation of the acetone, the fibers were heated for 2 hours at 125° C. to provide for a partial cure of the epoxy/amine coating (this system requires an elevated temperature cure). The weight ratio of epoxy to amine chosen was slightly less (100/23) than stoichiometric (100/34), but within usual recommended ranges (see Epon Resin Structural Reference Manual from Shell Chemical Co.). Twenty-four hours after coating the fibers, they were used to form a PPL/carbon fiber prepreg using the procedures described in Comparative Example 1, but with a drum temperature of 130° C.

EXAMPLE 1

A tow of carbon fibers (AS4-12K from Hercules) was coated with an epoxy resin and an amine-phosphine compound (curing agent - polymerization initiator) by pulling the tow through a nozzle where it was impregnated with a solution containing 1.1% g/ml DER 330 and 0.28% bis(3-aminopropyl) phenyl phosphine (aminephosphine) in methylene chloride. The weight ratio of epoxy to amine-phosphine chosen was slightly less (100/25) than stoichiometric (100/31). The methylene chloride was allowed to evaporate and then the fibers were rewound onto a 3-inch spool. About 24 hours after the fibers were coated, they were used to form a PPL/carbon prepreg using the procedures described in Comparative Example 1, with two differences. First, the drum temperature was 130° C. and more importantly, no initiator (Bu$_3$P) was added to the monomer, allowing the coating on the fibers to initiate polymerization.

EXAMPLE 2

Identical procedures to those in Example 1 were used except that the fibers were coated with a solution containing 1% g/ml DER 330 and 0.37% amine-phosphine in methylene chloride. Also, the amount of pivalolactone monomer added to the fibers was reduced by 20%.

COMPARATIVE EXAMPLE 5

A series of experiments were carried out to compare the flexural properties of the laminates of Comparative Examples 1 to 4 with the flexural properties of the laminates of Examples 1 and 2 prepared in accordance with the process of this invention. The properties were determined by ASTM D790 and are set forth in the following Table 1.

TABLE 1

Properties of Unidirectional PPL/Carbon-Fiber Laminates With Different Fiber Coatings

| Example | Wt % PPL | Wt % Coating on Fibers | Flexural Strength Absolute (ksi) | Percent of Theoretical Maximum[a] |
|---|---|---|---|---|
| C1[c] | 26 | 0 | 140 ± 12 | 41 |
| C2 | 31.5 | 0.92 epoxy[b] | 108 ± 8 | 35 |
| C3 | 27 | 0.94 epoxy 0.12 HMDA | 171 ± 6 | 51 |
| C4 | 24.3 | 0.94 epoxy 0.21 DDS | 169 ± 8 | 48 |
| 1 | 25.5 | 0.80 epoxy 0.21 amine-phosphine | 204 ± 10 | 60 |
| 2 | 22.9 | 0.75 epoxy | 242 ± 19 | 67 |

TABLE 1-continued

Properties of Unidirectional
PPL/Carbon-Fiber Laminates With
Different Fiber Coatings

| Example | Wt % PPL | Wt % Coating on Fibers | Flexural Strength Absolute (ksi) | Percent of Theoretical Maximum[a] |
|---|---|---|---|---|
| | | 0.27 amine-phosphine | | |

[a]Theoretical maximum = (volume % fibers) (fiber tensile strength).
[b]Dow epoxy resin DER 330
[c]Comparative Example.

COMPARATIVE EXAMPLE 6

A series of experiments were carried out to verify that the amine-phosphine coating on the fibers was actually responsible for initiating polymerization in Examples 1 and 2. In these experiments, pivalolactone monomer was added to a stainless steel pan which was then sealed to prevent evaporation. This pan was placed in a Dupont Instruments 9900 DSC and the temperature raised from 0° C. to 225° C. at a rate of 5° C./minute.

About 18 mg of pivalolactone was added to a DSC pan as described above. The center of the exotherm peak due to the thermal polymerization of pivalolactone was 177° C.

About 10 mg of pivalolactone and 10 mg of AS4-12K carbon fibers were added to a DSC pan and tested as described above. The exotherm peak was at 181° C.

About 19 mg of pivalolactone and 17 mg of the fiber coated as described in Example 1 was added to a DSC pan and tested as described above. The exotherm peak was at 125° C. This experiment was conducted about 19 hours after the fibers were coated and 5 hours before they were used in forming a PPL/carbon prepreg.

The results of these experiments are set forth in the following Table 2.

TABLE 2

DSC Scan Results

| Exp No | Weight of pivalolactone (mg) | Weight of Fiber (mg) | Wt % Coating on Fibers | Peak Exotherm Temperature (°C.) |
|---|---|---|---|---|
| 1 | 17.5 | 0 | 0 | 177 |
| 2 | 10 | 10 | 0 | 181 |
| 3 | 19 | 17 | 0.80 epoxy 0.21 amine-phosphine | 125 |

The downward shift in the peak exotherm temperature in the presence of coated fibers proves that this coating is responsible for initiation of polymerization.

What is claimed is:

1. A process for manufacture of composites comprising continuous reinforcing fibers dispersed in a continuous polymer phase, said process comprising the steps of:
   (a) impregnating one or more bundles of continuous reinforcing fibers with a curable resin which bonds to a surface of said fibers during curing of said resin, and with an initiator, said initiator selected from the group consisting of bi-functional initiators which contain one or more functional groups for promoting the curing of said resin and which contain one or more functional groups for initiating polymerization of monomer of a polymer, said initiator bonding to said resin during the curing thereof, and said initiator bonding to said polymer during the polymerization of said monomer forming residues which bond said resin to said polymer, and
   (b) partially, incompletely or completely curing said resin to form bundles of continuous reinforcing fibers impregnated with said partially, incompletely or completely cured resin bonded to the surface of said fibers; and
   (c) impregnating said bundles of continuous reinforcing fibers impregnated with said partially, incompletely or completely cured resin with monomer of said polymer, coating said partially, incompletely or completely cured resin; and
   (d) forming two or more of said bundles formed in step (c) into a composite employing a procedure selected from the group consisting of:
      (i) further curing said resin, if necessary, to form completely cured resin, and polymerizing said monomer impregnating said bundles to form a polymer and cured resin impregnated bundles of fibers,
         aligning two or more of said polymer and cured resin impregnated bundles into a desired shape, and molding said aligned bundles into a composite comprising fibers coated with said cured resin dispersed in a continuous phase of said polymer, said resin being bonded to said fiber and said polymer being bonded to said resin by residues of said initiator; and
      (ii) aligning two or more of said monomer and partially, incompletely or completely cured resin impregnated bundles of fibers into a desired shape, and
         further curing said resin, if necessary, to form cured resin and polymerizing said monomer impregnating said bundles to form a composite comprising fibers coated with said cured resin dispersed in a continuous phase of said polymer, said resin being bonded to said fiber and said polymer being bonded to said resin by residues of said initiator.

2. A process according to claim 1 wherein in step (b) said resin is completely cured.

3. A process according to claim 1 wherein in step (b) said resin is partially or incompletely cured, and said resin is further cured in step (d) to form completely cured resin.

4. A process according to claim 1 wherein a polymer is a poly(lactone).

5. A process according to claim 4 wherein said poly(lactone) is polypivalolactone.

6. A process according to claim 1 wherein said polymer is a polylactam.

7. A process according to claim 6 wherein said poly(lactam) is poly(caprolactam).

8. A process according to claim 1 wherein reinforcing fibers are inorganic fibers.

9. A process according to claim 8 wherein said fibers are selected from the group consisting of carbon fibers, boron fibers and glass fibers.

10. A process according to claim 9 wherein said fibers are carbon fibers.

11. A process according to claim 1 wherein said reinforcing fibers are high modulus polymeric fibers.

12. A process according to claim 11 wherein said polymeric fibers are selected from the group consisting of aramids, polyolefins, aromatic polyesters, aromatic poly(ester carbonates), polyimides, poly(amideimides), poly(esteramides), poly(esterimides), polyarylates and poly(etherimides).

13. A process according to claim 12 wherein said polymeric fibers are polyethylene.

14. A process according to claim 12 wherein said polymeric fibers are aramid.

15. A process according to claim 1 wherein said reinforcing fibers are multi-filament.

16. A shaped composite prepared by the process of claim 1.

17. A process of claim 1 comprising aligning multiple layers of polymer/cured resin coated high modulus fiber by winding said fibers on a substrate and molding said wound fibers on the substrate whereby a filament-wound article is produced.

18. A process according to claim 17 wherein said wound fibers are molded by heating at a temperature equal to or greater than about the softening temperature of said polymer coating said fiber.

19. A filament-wound article produced by the process of claim 17.

20. The process of claim 1 wherein multiple layers of polymer/cured resin coated fibers are aligned in substantially parallel array and are molded into a shaped article in said array whereby a pultrusion is formed.

21. A pultrusion produced by the process of claim 20.

22. A prepreg comprising bundles of continuous reinforcing fibers impregnating with partially or incompletely cured resin and impregnated with monomer of said polymer, said monomer, coating said partially or incompletely cured resin prepared by the process of claim 1.

23. The prepreg of claim 22 containing between about 25 and about 80 volume percent fibers.

24. The filament wound article of claim 19 wherein the filament winding portion contains between about 25 and about 80 volume percent fibers.

25. The pultrusion of claim 21 containing between about 25 and about 80 volume percent fibers.

26. A process according to claim 1 wherein said initiator is a multifunctional compound containing one or more functionalities for promoting the curing of resin and one or more functionalities for initiating the polymerization of said polymer.

27. A process according to claim 1 wherein said initiator comprises one or more compounds containing one or more functionalities for promoting the curing of said resin, and wherein said resin contains one or more functionalities for initiating the polymerization of said monomers.

* * * * *